(12) United States Patent
Radulescu et al.

(10) Patent No.: US 7,366,818 B2
(45) Date of Patent: Apr. 29, 2008

(54) INTEGRATED CIRCUIT COMPRISING A PLURALITY OF PROCESSING MODULES AND A NETWORK AND METHOD FOR EXCHANGING DATA USING SAME

(75) Inventors: Andrei Radulescu, Eindhoven (NL); Kees Gerard Willem Goossens, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 26 days.

(21) Appl. No.: 10/530,266

(22) PCT Filed: Jul. 4, 2003

(86) PCT No.: PCT/IB03/03035

§ 371 (c)(1),
(2), (4) Date: Apr. 5, 2005

(87) PCT Pub. No.: WO2004/034500

PCT Pub. Date: Apr. 22, 2004

(65) Prior Publication Data

US 2006/0041888 A1 Feb. 23, 2006

(30) Foreign Application Priority Data

Oct. 8, 2002 (EP) .................. 02079196

(51) Int. Cl.
*G06F 13/00* (2006.01)
*G06F 9/46* (2006.01)
(52) U.S. Cl. .............. 710/316; 710/306; 710/309; 719/313

(58) Field of Classification Search ........ 710/305–317, 710/36–38; 719/313; 709/236–242; 712/10–19, 712/28–38
See application file for complete search history.

(56) References Cited

U.S. PATENT DOCUMENTS 4,570,220 A 2/1986 Tetrick et al.

(Continued)

FOREIGN PATENT DOCUMENTS

EP 0 354 040 2/1990

(Continued)

OTHER PUBLICATIONS

M. Sgroi et al, "Addressing the System-on-a-Chip Interconnect Woes Through Communication-Based Design", XP-002301411, pp. 667-672, unknown date.

(Continued)

*Primary Examiner*—Raymond N Phan

(57) ABSTRACT

An integrated circuit comprising a plurality of processing modules M, S and a network N; RN arranged for providing at least one connection between a first and at least one second module M, S is provided. Said connection supports transactions comprising outgoing messages from the first module to the second modules and return messages from the second modules to the first module. Said integrated circuit comprises at least one dropping means DM for dropping data exchanged by said first and second module M, S. Accordingly, an alternative scheme for transaction completion is provided, where full and immediate transaction completion is merely applied for certain cases. The invention is based on the idea to allow the dropping of data in certain cases.

7 Claims, 1 Drawing Sheet

U.S. PATENT DOCUMENTS

| | | | |
|---|---|---|---|
| 4,807,118 | A | 2/1989 | Lin et al. |
| 4,842,740 | A | 6/1989 | Chung et al. |
| 5,098,985 | A | 3/1992 | Harris et al. |
| 5,341,369 | A | 8/1994 | Langer |
| 5,940,448 | A | 8/1999 | Kuo |
| 6,026,461 | A | 2/2000 | Baxter et al. |
| 6,248,469 | B1 | 6/2001 | Formato et al. |
| 6,311,212 | B1 | 10/2001 | Chong et al. |
| 6,339,788 | B1 | 1/2002 | Geyer et al. |
| 6,825,688 | B1 * | 11/2004 | Haehn ................ 326/38 |
| 6,885,638 | B2 * | 4/2005 | Xu et al. ............. 370/230 |
| 7,165,128 | B2 * | 1/2007 | Gadre et al. .......... 710/52 |
| 2002/0127454 | A1 | 9/2002 | Narang et al. |
| 2002/0174252 | A1 * | 11/2002 | Hayter et al. ........ 709/250 |
| 2003/0101307 | A1 * | 5/2003 | Gemelli et al. ....... 710/305 |
| 2003/0110339 | A1 * | 6/2003 | Calvignac et al. ..... 710/305 |
| 2004/0091762 | A1 | 5/2004 | Soczka-Guth et al. |
| 2004/0103230 | A1 * | 5/2004 | Emerson et al. ....... 710/110 |
| 2004/0131909 | A1 | 7/2004 | Soczka-Guth et al. |

FOREIGN PATENT DOCUMENTS

| | | |
|---|---|---|
| EP | 1 152 573 A2 | 11/2001 |
| WO | WO-00/27513 | 3/2000 |
| WO | WO-01/94450 | 12/2001 |
| WO | WO-02/36249 | 3/2002 |

OTHER PUBLICATIONS

Moore et al, "Balanced Self-Checking Asynchronous Logic for Smart Card Applications", Microprocessors and Microsystems, 2003 Elsevier B.V., pp. 1-10.

* cited by examiner

INTEGRATED CIRCUIT COMPRISING A PLURALITY OF PROCESSING MODULES AND A NETWORK AND METHOD FOR EXCHANGING DATA USING SAME

FIELD OF THE INVENTION

The invention relates to an integrated circuit having a plurality of processing modules and a network arranged for providing connections between processing modules and a method for exchanging messages in such an integrated circuit.

BACKGROUND OF THE INVENTION

Systems on silicon show a continuous increase in complexity due to the ever increasing need for implementing new features and improvements of existing functions. This is enabled by the increasing density with which components can be integrated on an integrated circuit. At the same time the clock speed at which circuits are operated tends to increase too. The higher clock speed in combination with the increased density of components has reduced the area which can operate synchronously within the same clock domain. This has created the need for a modular approach. According to such an approach the processing system comprises a plurality of relatively independent, complex modules. In conventional processing systems the systems modules usually communicate to each other via a bus. As the number of modules increases however, this way of communication is no longer practical for the following reasons. On the one hand the large number of modules forms a too high bus load. On the other hand the bus forms a communication bottleneck as it enables only one device to send data to the bus. A communication network forms an effective way to overcome these disadvantages.

Networks on chip (NoC) have received considerable attention recently as a solution to the interconnect problem in highly-complex chips. The reason is twofold. First, NoCs help resolve the electrical problems in new deep-submicron technologies, as they structure and manage global wires. At the same time they share wires, lowering their number and increasing their utilization. NoCs can also be energy efficient and reliable and are scalable compared to buses. Second, NoCs also decouple computation from communication, which is essential in managing the design of billion-transistor chips. NoCs achieve this decoupling because they are traditionally designed using protocol stacks, which provide well-defined interfaces separating communication service usage from service implementation.

Using networks for on-chip communication when designing systems on chip (SoC), however, raises a number of new issues that must be taken into account. This is because, in contrast to existing on-chip interconnects (e.g., buses, switches, or point-to-point wires), where the communicating modules are directly connected, in a NoC the modules communicate remotely via network nodes. As a result, interconnect arbitration changes from centralized to distributed, and issues like out-of order transactions, higher latencies, and end-to-end flow control must be handled either by the intellectual property block (IP) or by the network.

Most of these topics have been already the subject of research in the field of local and wide area networks (computer networks) and as an interconnect for parallel machine interconnect networks. Both are very much related to on-chip networks, and many of the results in those fields are also applicable on chip. However, NoC's premises are different from off-chip networks, and, therefore, most of the network design choices must be reevaluated. On-chip networks have different properties (e.g., tighter link synchronization) and constraints (e.g., higher memory cost) leading to different design choices, which ultimately affect the network services.

NoCs differ from off-chip networks mainly in their constraints and synchronization. Typically, resource constraints are tighter on chip than off chip. Storage (i.e., memory) and computation resources are relatively more expensive, whereas the number of point-to-point links is larger on chip than off chip. Storage is expensive, because general-purpose on-chip memory, such as RAMs, occupy a large area. Having the memory distributed in the network components in relatively small sizes is even worse, as the overhead area in the memory then becomes dominant.

For on-chip networks computation too comes at a relatively high cost compared to off-chip networks. An off-chip network interface usually contains a dedicated processor to implement the protocol stack up to network layer or even higher, to relieve the host processor from the communication processing. Including a dedicated processor in a network interface is not feasible on chip, as the size of the network interface will become comparable to or larger than the IP to be connected to the network. Moreover, running the protocol stack on the IP itself may also be not feasible, because often these IPs have one dedicated function only, and do not have the capabilities to run a network protocol stack.

The number of wires and pins to connect network components is an order of magnitude larger on chip than off chip. If they are not used massively for other purposes than NoC communication, they allow wide point-to-point interconnects (e.g., 300-bit links). This is not possible off-chip, where links are relatively narrower: 8-16 bits.

On-chip wires are also relatively shorter than off chip allowing a much tighter synchronization than off chip. This allows a reduction in the buffer space in the routers because the communication can be done at a smaller granularity. In the current semiconductor technologies, wires are also fast and reliable, which allows simpler link-layer protocols (e.g., no need for error correction, or retransmission). This also compensates for the lack of memory and computational resources.

Reliable communication: A consequence of the tight on-chip resource constraints is that the network components (i.e., routers and network interfaces) must be fairly simple to minimize computation and memory requirements. Luckily, on-chip wires provide a reliable communication medium, which can help to avoid the considerable overhead incurred by off-chip networks for providing reliable communication. Data integrity can be provided at low cost at the data link layer.

Deadlock: Computer network topologies have generally an irregular (possibly dynamic) structure, which can introduce buffer cycles. Deadlock can also be avoided, for example, by introducing constraints either in the topology or routing. Fat-tree topologies have already been considered for NoCs, where deadlock is avoided by bouncing back packets in the network in case of buffer overflow. Tile-based approaches to system design use mesh or torus network topologies, where deadlock can be avoided using, for example, a turn-model routing algorithm. Deadlock is mainly caused by cycles in the buffers. To avoid deadlock, routing must be cycle-free, because of its lower cost in achieving reliable communication. A second cause of deadlock are atomic chains of transactions. The reason is that while a module is locked, the queues storing transactions may get filled with transactions outside the atomic transaction chain, blocking the access of the transaction in the chain to reach the locked module. If atomic transaction chains must be implemented (to be compatible with processors allowing this, such as MIPS), the network nodes should be able to filter the transactions in the atomic chain.

Network flow control and buffering strategy: Network flow control and buffering strategy have a direct impact on the memory utilization in the network. Wormhole routing requires only a flit buffer (per queue) in the router, whereas store-and-forward and virtual-cut-through routing require at least the buffer space to accommodate a packet. Consequently, on chip, wormhole routing may be preferred over virtual-cut-through or store-and-forward routing. Similarly, input queuing may be a lower memory-cost alternative to virtual-output-queuing or output-queuing buffering strategies, because it has fewer queues. Dedicated (lower cost) FIFO memory structures also enable on-chip usage of virtual-cut-through routing or virtual output queuing for a better performance. However, using virtual-cut-through routing and virtual output queuing at the same time is still too costly.

Time-related guarantees: Off-chip networks typically use packet switching and offer best-effort services. Contention can occur at each network node, making latency guarantees very hard to offer. Throughput guarantees can still be offered using schemes such as rate-based switching or deadline-based packet switching, but with high buffering costs. An alternative to provide such time-related guarantees is to use time-division multiple access (TDMA) circuits, where every circuit is dedicated to a network connection. Circuits provide guarantees at a relatively low memory and computation cost. Network resource utilization is increased when the network architecture allows any left-over guaranteed bandwidth to be used by best-effort communication.

Introducing networks as on-chip interconnects radically changes the communication when compared to direct interconnects, such as buses or switches. This is because of the multi-hop nature of a network, where communication modules are not directly connected, but separated by one or more network nodes. This is in contrast with the prevalent existing interconnects (i.e., buses) where modules are directly connected. The implications of this change reside in the arbitration (which must change from centralized to distributed), and in the communication properties (e.g., ordering, or flow control).

An outline the differences of NoCs and buses will be given below. We refer mainly to buses as direct interconnects, because currently they are the most used on-chip interconnect. Most of the bus characteristics also hold for other direct interconnects (e.g., switches). Multilevel buses are a hybrid between buses and NoCs. For our purposes, depending on the functionality of the bridges, multilevel buses either behave like simple buses or like NoCs. The programming model of a bus typically consists of load and store operations which are implemented as a sequence of primitive bus transactions. Bus interfaces typically have dedicated groups of wires for command, address, write data, and read data. A bus is a resource shared by multiple IPs. Therefore, before using it, IPs must go through an arbitration phase, where they request access to the bus, and block until the bus is granted to them.

A bus transaction involves a request and possibly a response. Modules issuing requests are called masters, and those serving requests are called slaves. If there is a single arbitration for a pair of request-response, the bus is called non-split. In this case, the bus remains allocated to the master of the transaction until the response is delivered, even when this takes a long time. Alternatively, in a split bus, the bus is released after the request to allow transactions from different masters to be initiated. However, a new arbitration must be performed for the response such that the slave can access the bus.

For both split and non-split buses, both communication parties have direct and immediate access to the status of the transaction. In contrast, network transactions are one-way transfers from an output buffer at the source to an input buffer at the destination that causes some action at the destination, the occurrence of which is not visible at the source. The effects of a network transaction are observable only through additional transactions. A request-response type of operation is still possible, but requires at least two distinct network transactions. Thus, a bus-like transaction in a NoC will essentially be a split transaction.

In addition, in a network at each layer in the protocol stack, control information must be supplied together with the data (e.g., packet type, network address, or packet size). This control information is organized as an envelope around the data. That is, first a header is sent, followed by the actual data (payload), followed possibly by a trailer. Multiple such envelopes may be provided for the same data, each carrying the corresponding control information for each layer in the network protocol stack.

Buffering and Flow Control: Buffering data of a master (output buffering) is used both for buses and NoCs to decouple computation from communication. However, for NoCs output buffering is also needed to marshal data, which consists of (a) (optionally) splitting the outgoing data in smaller packets which are transported by the network, and (b) adding control information for the network around the data (packet header). To avoid output buffer overflow the master must not initiate transactions that generate more data than the currently available space. Similarly to output buffering, input buffering is also used to decouple computation from communication. In a NoC, input buffering is also required to un-marshal data.

In addition, flow control for input buffers differs for buses and NoCs. For buses, the source and destination are directly linked, and, destination can therefore signal directly to a source that it cannot accept data. This information can even be available to the arbiter, such that the bus is not granted to a transaction tying to write to a full buffer.

In a NoC, however, the destination of a transaction cannot signal directly to a source that its input buffer is full. Consequently, transactions to a destination can be started, possibly from multiple sources, after the destination's input buffer has filled up. If an input buffer is full, additional incoming transitions are not accepted, and stored in the network. However, this approach can easily lead to network congestion, back pressure and deadlock, as the data could be eventually stored all the way to the sources, blocking the links in between.

When a master needs to send data to a slave, the master can not be stopped directly by the slave when its buffer space is full. In order to avoid a buffer overflow there must be some kind of agreement between the master and the slave in which the slave reserves buffer space for that master and keeps the master informed of the available buffer space, i.e. when more buffer space has been consumed. This scheme will however generate extra traffic in the network and may lead to a non-efficient network resource utilization, e.g. because of a pessimistic buffer allocation.

To avoid input buffer overflow connections can be used, together with end-to-end flow control. At connection set up between a master and one or more slaves, buffer space is allocated at the network interfaces of the slaves, and the network interface of the master is assigned credits reflecting the amount of buffer space at the slaves. The master can only send data when it has enough credits for the destination slave(s). The slaves grant credits to the master when they consume data.

End-to-end flow control is implemented between a master and a slave to ensure that no data is dropped in the connection between the modules. The data arrive in the requested order and in time, therefore no contention or "traffic jam" will occur in the network. However, end-to-end flow control is expensive to implement.

SUMMARY OF THE INVENTION

It is an object of the invention to provide an integrated circuit and a method for exchanging messages in an integrated circuit which ensures transaction completion at lower cost.

Therefore, an integrated circuit comprising a plurality of processing modules M, S and a network N; RN arranged for providing at least one connection between a first and at least one second module M, S is provided. Said connection supports transactions comprising outgoing messages from the first module to the second modules and return messages from the second modules to the first module. Said integrated circuit comprises at least one dropping means DM for dropping data exchanged by said first and second modules M, S.

Accordingly, an alternative scheme for transaction completion is provided, where full and immediate transaction completion is merely applied for certain cases.

The invention is based on the idea to allow the dropping of data in certain cases.

According to an aspect of the invention, an integrated circuit comprising at least one interface means ANIP, PNIP for managing the interface between a module M, S and the network N, RN is provided, wherein said interface means ANIP, PNIP comprises a first dropping means DM for dropping data. The dropping of data and therefore the transaction completion can be controlled by the interface means.

According to a further aspect of the invention, an integrated circuit is provided with a network N, RN comprised of a plurality of network routers for forwarding data without dropping data, i.e. only the interface means are allowed to drop data.

According to still a further aspect of the invention, said dropping means DM are adapted to create an error message if data is dropped. Therefore, a source of said data is informed of the dropping of the data, so that it can re-send said data later on, which will be part of another transaction.

According to a further aspect of the invention said dropping means DM are adapted to send said error message to a first dropping means DM. Hence, error messages are send to the dropping means in the interface means.

According to still a further aspect of the invention, said dropping means DM are adapted to send said error message to said first module M. The error messages are directly send to the first module.

According to a further aspect of the invention, said interface means ANIP, PNIP is adapted to store received error messages. It is therefore possible for the interface means to keep track of the completion of transactions.

According to a further aspect of the invention, an interface means ANIP associated to the first module M is adapted not to drop error messages.

The invention also relates to a method for exchanging messages in an integrated circuit comprising a plurality of modules. The messages between the modules are being exchanged over connections via a network, wherein data exchanged by said first and second module M, S can be dropped.

The invention also relates to a method for exchanging messages in an integrated circuit comprising a plurality of modules as described above.

Further aspects of the invention are described in the dependent claims.

These and other aspects of the invention are apparent from and will be elucidated with reference to the embodiment(s) described hereinafter.

DESCRIPTION OF THE PREFERRED EMBODIMENTS

The following embodiments relate to systems on chip, i.e. a plurality of modules on the same chip communicate with each other via some kind of interconnect. The interconnect is embodied as a network on chip NOC. The network on chip may include wires, bus, time-division multiplexing, switch, and/or routers within a network. At the transport layer of said network, the communication between the modules are performed over connections. A connection is considered as a set of channels, each having a set of connection properties, between a first module and at least one second module. For a connection between a first module and a single second module, the connection comprises two channel, namely one from the first module to the second channel, i.e. the request channel, and a second form the second to the first module, i.e. the response channel. The request channel is reserved for data and messages from the first to the second, while the response channel is reserved for data and messages from the second to the first module. However, if the connection involves one first and N second modules, 2*N channels are provided. The connection properties may include ordering (data transport in order), flow control (a remote buffer is reserved for a connection, and a data producer will be allowed to send data only when it is guaranteed that space is available for the produced data), throughput (a lower bound on throughput is guaranteed), latency (upper bound for latency is guaranteed), the lossiness (dropping of data), transmission termination, transaction completion, data correctness, or data delivery.

Figure 1:
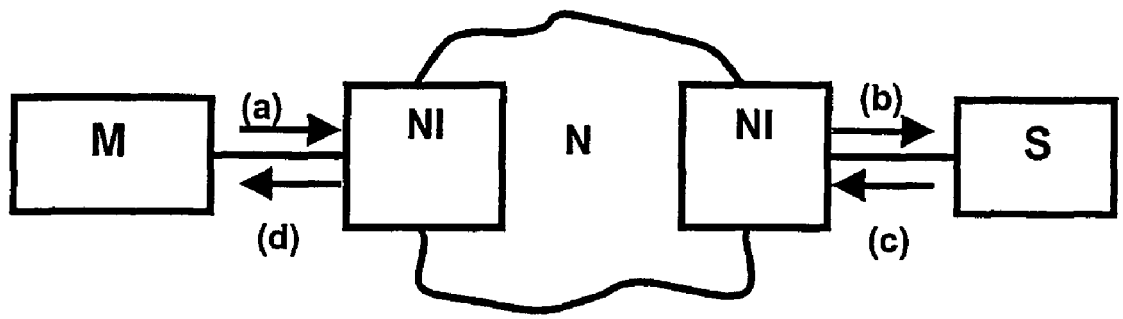
FIG. 1 shows a System on chip according to a first embodiment.

FIG. 1 shows a System on chip according to a first embodiment. The system comprises a master module M, a slave modules S. Although just one slave module is shown in FIG. 1, the system may comprise a plurality of slave modules. Each module is connected to a network N via a network interface NI, respectively. The network interfaces NI are used as interfaces between the master and slave module M, S and the network N. The network interfaces NI are provided to manage the communication of the respective modules and the network N, so that the modules can perform their dedicated operation without having to deal with the communication with the network or other modules. Each network interfaces comprises a buffer for buffering data and messages.

The communication according to this embodiment is transaction based. These transactions consist of a request and possibly a response. Typically, a request is initiated by the master M (a), send to the slave S via the two network interfaces NI and the network N (b). The slave S may respond (c) and a response is send back to the master M (d). However, some transactions may exist, where no response from the slave S is necessary. In such a case the transaction is completed when it has been executed by the slave S. A transaction with a response is completed when the response has been delivered to the master M. Therefore, the master can only detect the completion of the transaction if it receives a response. As long as a flow control is implemented in the network, the deliverance of the request as well as the response are guaranteed and therefore transaction completeness is guaranteed. However, if no end-to-end flow control is implemented both the request and the response may be dropped and hence no transaction completion is guaranteed.

Figure 2:
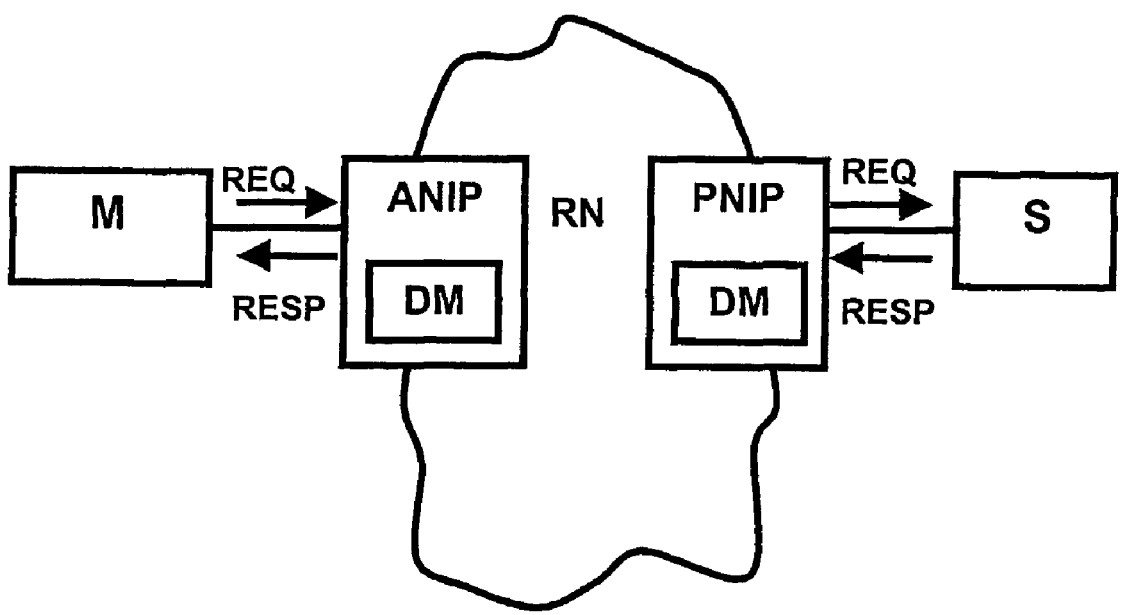
FIG. 2 shows a System on chip according to a second embodiment.

FIG. 2 shows a system on chip according to a second embodiment. The system comprises two modules, namely a master M and a slave S module, a router network RN, and two network interfaces ANIP, PNIP between the modules and the router network RN. The network interfaces provide two network interface ports NIP (one request and one response port) through which the modules communicate with the router network RN or other modules via the router network RN. The network interface associated to the master module M is called the active network interface ports ANIP and the network interface associated to the slave module S is called the passive network interface ports PNIP. The communication between the master module M and the slave module s is based on request-response transactions, where the master M initiates a transaction by placing a request, possibly with some data or required connection properties. The request REQ is delivered to the slave S via the active network interface port ANIP, the network RN and the passive network interface port PNIP. The request is executed by the slave module S and data is returned as a response RESP if necessary or required. This response RESP may include data and/or acknowledgement for the master M.

Here, it is assumed, that the network N, RN, i.e. the routers, do not drop data. The active network interface ANIP as well as the passive network interface PNIP comprise a dropping manager DM, respectively. These dropping managers DM are responsible for the dropping of data or massages, i.e. only the network interfaces are able to drop data or messages. In particular, requests can only be dropped by the active network interface ports ANIP, while responses can only be dropped by the passive network interface ports PNIP. Possible scenarios include: (a) the oldest message is dropped (milk policy), or (b) the newest message is dropped (wine policy).

A transaction can be composed from the following messages:

A command message (CMD) is sent by the ANIP, and describes the action to be executed at the slave connected to the PNIP. Examples of commands are read, write, test and set, and flush. Commands are the only messages that are compulsory in a transaction. For NIPs that allow only a single command with no parameters (e.g., fixed-size address-less write), we assume the command message still exists, even if it is implicit (i.e., not explicitly sent by the IP).

An out data message (OUTDATA) is sent by the ANIP following a command that requires data to be executed (e.g., write, multicast, and test-and-set).

A return data message (RETDATA) is sent by a PNIP as a consequence of a transaction execution that produces data (e.g., read, and test-and-set).

A completion acknowledgment message (RETSTAT) is an optional message which is returned by PNIP when a command has been completed. It may signal either a successful completion or an error. For transactions including both RETDATA and RETSTAT the two messages can be combined in a single message for efficiency. However, conceptually, they exist both: RETSTAT to signal the presence of data or an error, and RETDATA to carry the data.

Messages composing a transaction are divided in outgoing messages, namely CMD and OUTDATA, and response messages, namely RETDATA, RETSTAT. Within a transaction, CMD precedes all other messages, and RETDATA precedes RETSTAT if present. These rules apply both between master and ANIP, and PNIP and slave.

A transaction without a response (e.g. a posted write) is said to be complete when it has been executed by the slave. As there is no response message to the master, no guarantee regarding transaction completion can be given. A transaction with a response (e.g. an acknowledged write) is said to be complete when a RETSTAT message is received from the ANIP. Recall that when data is received as a response (RETDATA), a RETSTAT (possibly implicit) is also received to validate the data. The transaction may either be executed successfully, in which case a success RETSTAT is returned, fail in its execution at the slave, and then an execution error RETSTAT is returned, or fail because of buffer overflow in a connection with no flow control, and then it reports an overflow error. We assume that when a slave accepts a CMD requesting a response, the slave S always generates the response.

The dropping manager DM may drop data in case of buffer overflow. All of CMD, OUTDATA, and RETDATA may be dropped. To guarantee transaction completion, RETSTAT is not allowed to be dropped. Consequently, in the ANIPs enough buffer space must be provided to accommodate RETSTAT messages for all outstanding transactions. This is enforced by bounding the number of outstanding transactions.

For the case of several slaves S in the above system, return message or response messages could be combined as follows. If each of write transaction (initiated by the master M) has been successfully executed by all slaves S, all will return RETSTAT=RETOK messages, which can be combined by the ANIP in a single message to be delivered to the master.

If the write transaction has been successfully executed only by some slaves, there will be a mix of RETSTATs (RETOK and RETERROR). They can either be combined into:

a) a single RETSTAT=RETERROR, to specify that an error occurred, or b) a single RETSTAT, but a larger one, more descriptive, encoding where there have been errors.

All RETSTATs can be bundled together in a single RETSTAT for the master, or <slave identifiers,error code> pairs can be bundled to form a single RETSTAT for the master.

If the connection has no flow control, messages can be dropped by the dropping managers DM, resulting also in RETSTAT=RETLOST messages. Again, combinations as those above can be made.

The master module M should always receive a response to a transaction. This is achieved by the dropping managers DM. If the dropping manager DM in the passive network interface ports PNIP drops data or messages possibly because of a buffer overflow, it always returns a FAIL/ ERROR message to the ANIP. This return status (RET-STAT) message will never be dropped by the dropping manager of the active network interface ports ANIP because the ANIP that initiated the transaction will reserve space for return messages of every transaction that it initiates. This combination of reserving space and generating an error message whenever a message is dropped is a way to introduce flow control. Preferably, the RETSTAT message is generated by the interface of the slave module, although alternatively it could be generated at the intermediary network nodes too.

By implementing the above dropping scheme, transaction completion is guaranteed, i.e. it is always known whether an initiated transaction:
a) was delivered and executed successfully at the slave (RETSTAT=OK produced by the slave),
b) was never delivered at the slave (RETSTAT=REQLOST produced by the PNIP and returned to the ANIP),
c) was delivered at the slave, but not successfully executed (RETSTAT=ERROR produced by the slave), or
d) was delivered and executed successfully at the slave but the response message was dropped (RETSTAT=RETLOST produced by the ANIP and delivered to the master M).

This is achieved by either not dropping messages (flow-controlled connection), in this case RETSTAT is either OK or ERROR, or by allowing messages to be dropped (on a connection without flow control), but generating a RESTAT (REQLOST or RETLOST) whenever the message is dropped, or a RETOK or RETERROR as usual when the message is not dropped.

It is essential however, never to drop RETSTATs, because this completes the transaction. This is realized in that a buffer for the RETSTAT is located at the master's ANIP. The latter reserves space for RETSTATs when initiating transactions, and bounds the number of outstanding transactions (for finite sized RETSTAT buffers).

The flow control on the outgoing and return connections is in principle independent. Thus, for outgoing flow control & return flow control, the RETSTAT message is according to a) or c) above. In case of outgoing flow control & no return flow control, the RETSTAT message is a) or c) or d) above. In case of no outgoing flow control & return flow control, the RETSTAT message is a) or b) or c) above.

For the above system, connections can be classified as follows:
A simple connection is a connection between one ANIP and one PNIP.
A narrowcast connection is a connection between one ANIP and one or more PNIPs, in which each transaction that the ANIP initiates is executed by exactly one PNIP. An example of the narrowcast connection, where the ANIP performs transactions on an address space which is mapped on two memory modules. Depending on the transaction address, a transaction is executed on only one of these two memories.
A multicast connection is a connection between one ANIP and one or more PNIPs, in which the sent messages are duplicated and each PNIP receives a copy of those messages. In a multicast connection no return messages are currently allowed, because of the large traffic they generate (i.e., one response per destination). It could also increase the complexity in the ANIP because individual responses from PNIPs must be merged into a single response for the ANIP. This requires buffer space and/or additional computation for the merging itself.

Connecting properties that can be configured for a connection are as follows: guaranteed message integrity, guaranteed transaction completion, various transaction orderings, guaranteed throughput, bounded latency and jitter, and connection flow control.

The modules as described in FIGS. 1 and 2 can be so-called intellectual property blocks IPs (computation elements or memories, but not interconnection elements) that interact with network at said network interfaces NI. NIs provide NI ports NIP through which the communication services are accessed. A NI can have several NIPs to which one or more IPs can be connected. Similarly, an IP can be connected to more than one NI and NIP.

The communication over the network is performed by the network interfaces on connections, i.e. the master and the slave module are invisible to the network. Connections are introduced to describe and identify communication with different properties, such as guaranteed throughput, bounded latency and jitter, ordered delivery, or flow control. The connections according to the embodiments of the invention must be first created or established with the desired properties before being used. This may result in resource reservations inside the network (e.g., buffer space, or percentage of the link usage per time unit). If the requested resources are not available, the network RN will refuse the request. After usage, connections are closed, which leads to freeing the resources occupied by that connection.

At both ANIP and PNIPs, outgoing messages belonging to different transactions on the same connection are allowed to be interleaved. For example, two write commands can be issued, and only afterwards their data. If the order of OUTDATA messages differs from the order of CMD messages, transaction identifiers must be introduced to associate OUTDATAs with their corresponding CMD.

Outgoing messages can be delivered by the PNIPs to the slaves (see b) as follows:
Unordered, which imposes no order on the delivery of the outgoing messages of different transactions at the PNIPs.
Ordered locally, where transactions must be delivered to each PNIP in the order they were sent (a), but no order is imposed across PNIPs. Locally-ordered delivery of the outgoing messages can be provided either by an ordered data transportation, or by reordering outgoing messages at the PNIP.
Ordered globally, where transactions must be delivered in the order they were sent, across all PNIPs of the connection. Globally-ordered delivery of the outgoing part of transactions require a costly synchronization mechanism.

Transaction response messages can be delivered by the slaves to the PNIPs (c) as Ordered, when RETDATA and RETSTAT messages are returned in the same order as the CMDs were delivered to the slave (b), or as Unordered, otherwise. When responses are unordered, there has to be a mechanism to identify the transaction to which a response belongs. This is usually done using tags attached to messages for transaction identifications (similar to tags in VCI).

Response messages can be delivered by the ANIP to the master (see d) as follows:

Unordered, which imposes no order on the delivery of responses. Here, also, tags must be used to associate responses with their corresponding CMDs.

Ordered locally, where RETDATA and RETSTAT messages of transactions for a single slave are delivered in the order the original CMDs were presented by the master to the ANIP. Note that there is no ordering imposed for transactions to different slaves within the same connection.

Globally ordered, where all responses in a connection are delivered to the master in the same order as the original CMDs. When transactions are pipelined on a connection, then globally-ordered delivery of responses requires reordering at the ANIP.

All 3×2×3=18 combinations between the above orderings are possible. Out of these, the following two are defined. An unordered connection is a connection in which no ordering is assumed in any part of the transactions. As a result, the responses must be tagged to be able identify to which transaction they belong. Implementing unordered connections has low cost, however, they may be harder to use, and introduce the overhead of tagging.

In an alternative embodiment, the dropping means as described above may be implemented in some of the routers of the network, so that these routers are allowed to drop data. However, in such a case they must follow the above scheme and in particular create the above error messages.

In another alterative embodiment of the invention, the transaction completion can be implemented in systems which are not connection based, as such a system is equivalent to a system with a single connection It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. In the device claim enumerating several means, several of these means can be embodied by one and the same item of hardware. The mere fact that certain measures are recited in mutually different dependent claims does not indicate that a combination of these measures cannot be used to advantage.

Furthermore, any reference signs in the claims shall not be construed as limiting the scope of the claims.

The invention claimed is:

1. Integrated circuit comprising a plurality of processing modules (M, S) said modules being disposed on the same chip, and a network (N; RN) arranged for providing at least one connection between a first and at least one second module (M, S), wherein said modules communicate via a network on chip, and wherein said connection supports transactions comprising outgoing messages from the first module to the second modules and return messages from the second modules to the first module, the integrated circuit comprising at least one dropping means (DM) for dropping data exchanged by said first and second module (M, S), and at least one interface means (ANIP, PNIP) for managing the interface between a module (M, S) and the network (N, RN), wherein said interface means (ANIP, PNIP) comprises a first dropping means (DM) for dropping data, and wherein the dropping of data and therefore the transaction completion can be controlled by the interface means.

2. Integrated circuit according to claim 1, wherein said network (N, RN) comprises a plurality of network routers for forwarding data without dropping data.

3. Integrated circuit according to claim 2, wherein said dropping means (DM) are adapted to create an error message if data is dropped.

4. Integrated circuit according to claim 3, wherein said dropping means (DM) are adapted to send said error message to a first dropping means (DM).

5. Integrated circuit according to claim 3, wherein said dropping means (DM) are adapted to send said error message to said first module (M).

6. Integrated circuit according to claim 4 or 5, wherein said interface means (ANIP, PNIP) is adapted to store received error messages.

7. Integrated circuit according to claim 6, wherein an interface means (ANIP) associated to the first module (M) is adapted not to drop error messages.

* * * * *